(12) United States Patent
Hashimoto et al.

(10) Patent No.: US 12,230,796 B2
(45) Date of Patent: Feb. 18, 2025

(54) SECONDARY BATTERY

(71) Applicant: MURATA MANUFACTURING CO., LTD., Kyoto (JP)

(72) Inventors: Takuju Hashimoto, Kyoto (JP); Yuki Niwata, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 470 days.

(21) Appl. No.: 17/703,293

(22) Filed: Mar. 24, 2022

(65) Prior Publication Data

US 2022/0216472 A1 Jul. 7, 2022

Related U.S. Application Data

(63) Continuation of application No. PCT/JP2020/033536, filed on Sep. 4, 2020.

(30) Foreign Application Priority Data

Sep. 30, 2019 (JP) .................. 2019-178788

(51) Int. Cl.
*H01M 4/525* (2010.01)
*C01G 51/42* (2025.01)
(Continued)

(52) U.S. Cl.
CPC ............ *H01M 4/525* (2013.01); *C01G 51/42* (2013.01); *H01M 10/0525* (2013.01);
(Continued)

(58) Field of Classification Search
CPC ............ H01M 4/525; H01M 10/0525; H01M 10/0569; H01M 2004/028; H01M 2300/0037; C01G 51/42; C01P 2002/50
(Continued)

(56) References Cited

U.S. PATENT DOCUMENTS

2007/0224514 A1* 9/2007 Kotato .............. H01M 10/0567
429/325
2009/0181311 A1 7/2009 Iwanaga et al.
2020/0136126 A1* 4/2020 Hong ................ H01M 10/0525

FOREIGN PATENT DOCUMENTS

CN 102569893 7/2012
CN 103855379 6/2014
(Continued)

OTHER PUBLICATIONS

International Search Report of corresponding PCT application PCT/JP2020/033536, dated Nov. 17, 2020.
(Continued)

*Primary Examiner* — Ekandra S. Miller-Cruz
*Assistant Examiner* — Kevin Nguyen
(74) *Attorney, Agent, or Firm* — K&L Gates LLP

(57) ABSTRACT

A secondary battery includes a positive electrode, a negative electrode, and an electrolytic solution. The positive electrode includes a positive electrode active material particle. The positive electrode active material particle includes a layered rock-salt lithium composite oxide and a spinel metal oxide. The positive electrode active material particle has therein the spinel metal oxide provided on at least a surface of a particle including the layered rock-salt lithium composite oxide. The electrolytic solution includes a chain carboxylic acid ester and a cyclic ether.

15 Claims, 4 Drawing Sheets

(51) Int. Cl.
  *H01M 10/0525* (2010.01)
  *H01M 10/0569* (2010.01)
  *H01M 4/02* (2006.01)

(52) U.S. Cl.
  CPC ..... *H01M 10/0569* (2013.01); *C01P 2002/50* (2013.01); *C01P 2006/40* (2013.01); *H01M 2004/028* (2013.01); *H01M 2300/0037* (2013.01)

(58) Field of Classification Search
  USPC ........................................................ 429/229
  See application file for complete search history.

(56) References Cited

FOREIGN PATENT DOCUMENTS

| | | | | |
|---|---|---|---|---|
| EP | 2314545 A1 | * | 4/2011 | ............. C01G 51/04 |
| JP | 2013225388 A | | 10/2013 | |
| JP | 2017152223 A | | 8/2017 | |
| JP | 2019106362 A | | 6/2019 | |
| KR | 20180039039 | | 4/2018 | |
| WO | 2007139130 A1 | | 12/2007 | |
| WO | 2016129629 A1 | | 8/2016 | |

OTHER PUBLICATIONS

Chinese Office Action issued Sep. 15, 2023 in corresponding Chinese Application No. 202080068425.X.

* cited by examiner

[ FIG. 2 ]
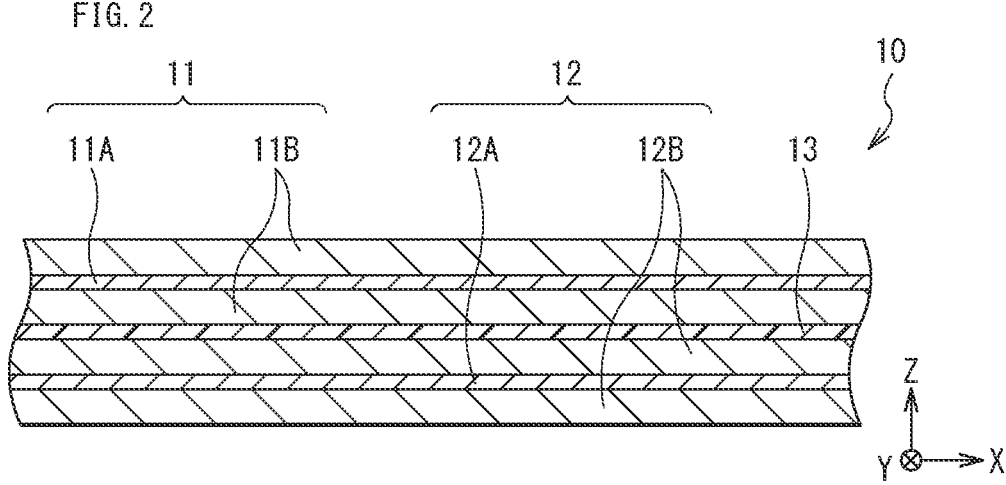
[ FIG. 3 ]
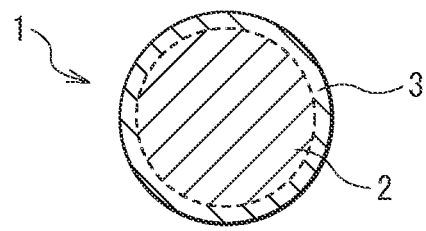

[ FIG. 4 ]
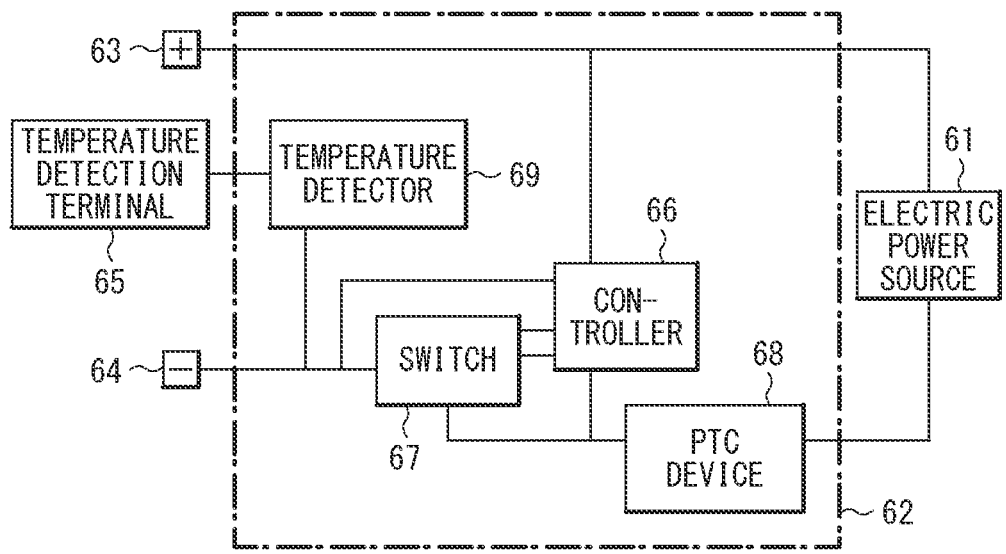
[ FIG. 5 ]
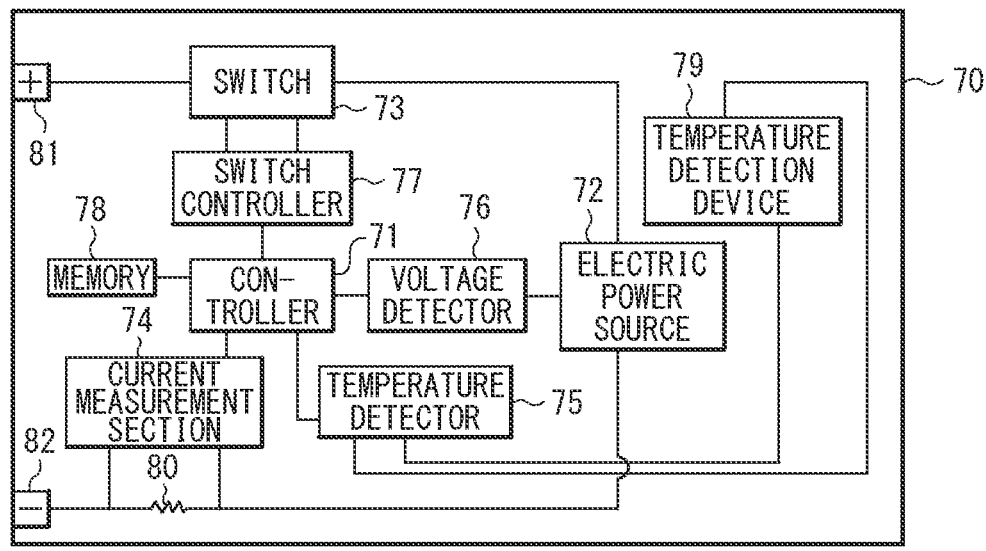

[FIG. 6]
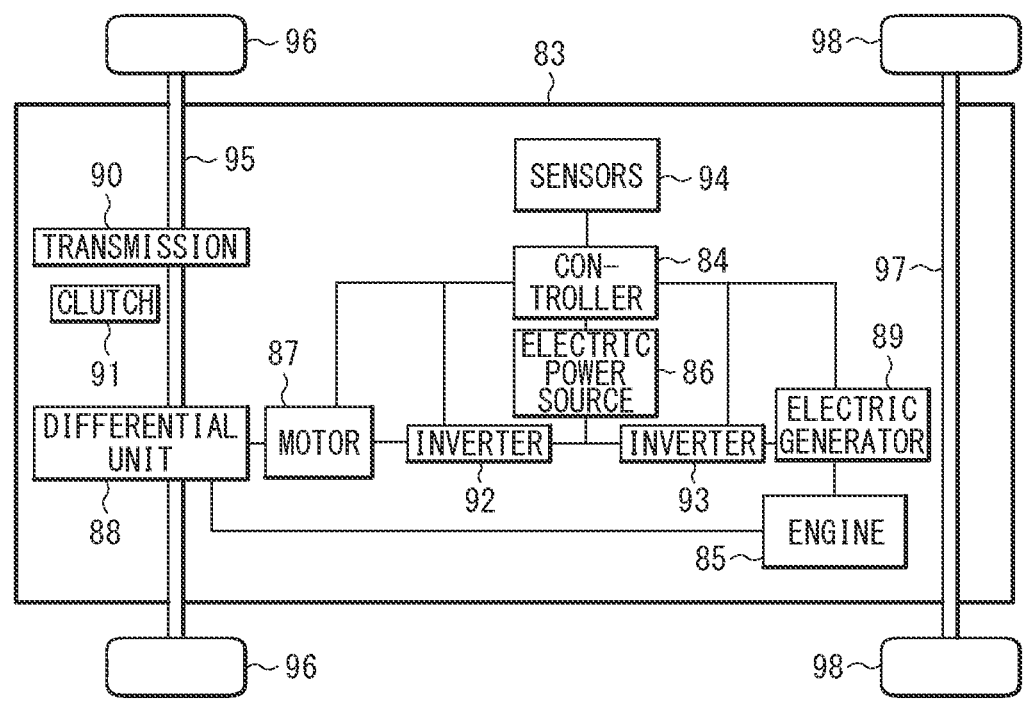

SECONDARY BATTERY

CROSS REFERENCE TO RELATED APPLICATIONS

The present application is a continuation of PCT patent application no. PCT/JP2020/033536, filed on Sep. 4, 2020, which claims priority to Japanese patent application no. JP2019-178788 filed on Sep. 30, 2019, the entire contents of which are being incorporated herein by reference.

BACKGROUND

The present technology generally relates to a secondary battery.

Various electronic apparatuses such as mobile phones have been widely used. Accordingly, a secondary battery is under development as a power source which is smaller in size and lighter in weight and allows for a higher energy density. A configuration of the secondary battery influences battery characteristics, and has thus been given various considerations.

Specifically, in order to reduce elution of nickel from a nickel-rich positive electrode into an electrolyte solution, an appropriate range of a content of nickel in a positive electrode active material is defined, and the electrolytic solution includes lithium fluorosulfonate. In addition, in order to improve high- and low-temperature battery characteristics, an electrolytic solution includes a chain carboxylic acid ester or a cyclic ether.

SUMMARY

The present technology generally relates to a secondary battery.

Although various considerations have been given to solve an issue of a secondary battery, entering and exiting of lithium are not sufficiently secured yet and a decomposition reaction of an electrolytic solution is also not sufficiently suppressed yet. Accordingly, there is still room for improvement in terms of securing entering and exiting of lithium and suppressing the decomposition reaction of the electrolytic solution.

The present technology has been made in view of such an issue and it is an object of the technology to provide a secondary battery that makes it possible to secure entering and exiting of lithium and also to suppress the decomposition reaction of the electrolytic solution.

A secondary battery according to an embodiment of the present technology includes a positive electrode, a negative electrode, and an electrolytic solution. The positive electrode includes a positive electrode active material particle. The positive electrode active material particle includes a layered rock-salt lithium composite oxide represented by Formula (1) and a spinel metal oxide represented by Formula (2). The positive electrode active material particle has therein the spinel metal oxide provided on at least a surface of the layered rock-salt lithium composite oxide. The electrolytic solution includes a chain carboxylic acid ester and a cyclic ether.

$$Li_xCo_aNi_bM_{(1-a-b)}O_2 \quad (1)$$

where:
M represents at least one of magnesium (Mg), aluminum (Al), titanium (Ti), manganese (Mn), yttrium (Y), zirconium (Zr), molybdenum (Mo), or tungsten (W); and
x, a, and b satisfy $0.9 \leq x \leq 1.2$, $0 \leq a \leq 1$, and $0 \leq b \leq 1$, respectively.

$$X_3O_4 \quad (2)$$

where X includes at least one of cobalt (Co), aluminum, magnesium, or zinc (Zn).

Here, the term "chain carboxylic acid ester" is a generic term for a condensation reaction product of a carboxylic acid (an oxo acid) and an alcohol, i.e., a chain compound having a so-called ester bond. In addition, the term "cyclic ether" is a generic term for a cyclic hydrocarbon compound having an ether bond (—O—). Details of the chain carboxylic acid ester and the cyclic ether will each be described later.

According to the secondary battery of an embodiment of the present technology, the positive electrode active material particle of the positive electrode has therein the spinel metal oxide on the surface of the particle including the layered rock-salt lithium composite oxide, and the electrolytic solution includes the chain carboxylic acid ester and the cyclic ether. Accordingly, it is possible to secure entering and exiting of lithium and also to suppress the decomposition reaction of the electrolytic solution.

It should be understood that effects of the technology are not necessarily limited to those described above and may include any of a series of effects described below in relation to the technology.

BRIEF DESCRIPTION OF THE FIGURES

FIG. 2 is a sectional view of a configuration of a wound electrode body illustrated in FIG. 1.

FIG. 3 is a sectional view of a configuration of a positive electrode active material particle according to an embodiment of the present technology.

FIG. 4 is a block diagram illustrating a configuration of an application example of the secondary battery according to an embodiment of the present technology (a battery pack including a single battery).

FIG. 5 is a block diagram illustrating a configuration of an application example of the secondary battery according to an embodiment of the present technology (a battery pack including an assembled battery).

FIG. 6 is a block diagram illustrating a configuration of an application example of the secondary battery according to an embodiment of the present technology (an electric vehicle).

DETAILED DESCRIPTION

Figure 1:
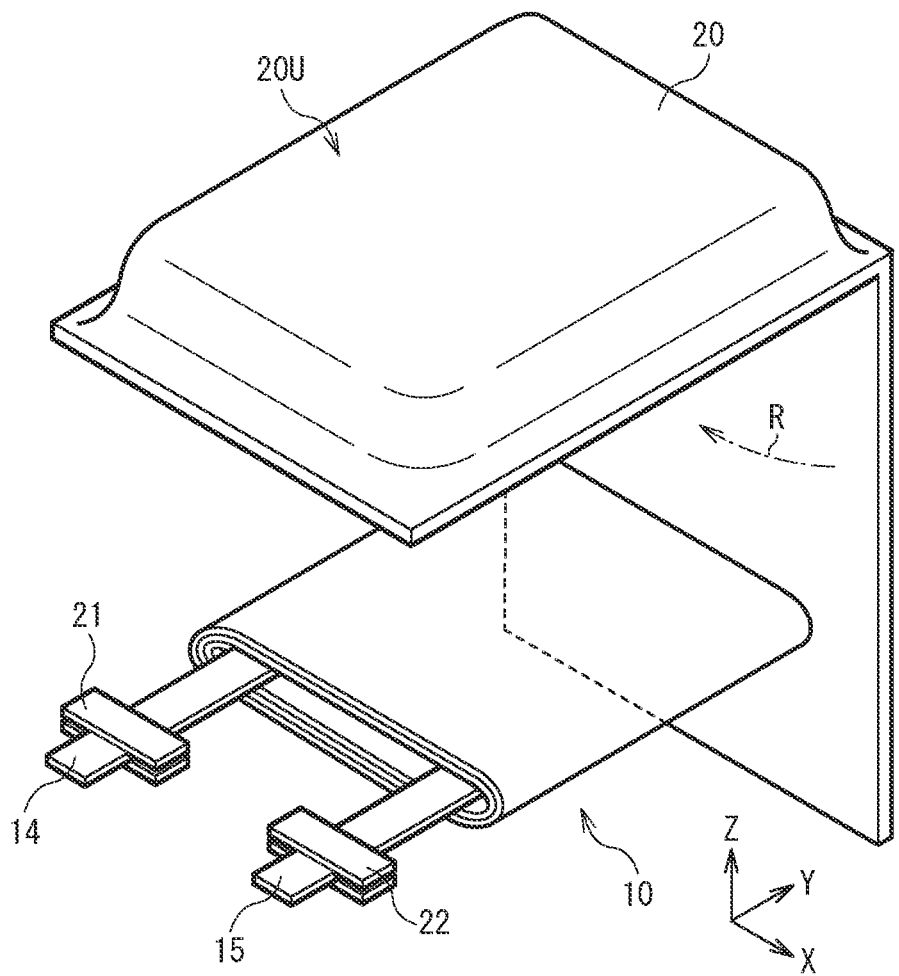
FIG. 1 is a perspective view of a configuration of a secondary battery (laminated-film type) according to an embodiment of the present technology.

As described herein, the present disclosure will be described based on examples with reference to the drawings, but the present disclosure is not to be considered limited to the examples, and various numerical values and materials in the examples are considered by way of example.

A description is given first of a secondary battery according to one embodiment of the present technology.

The secondary battery to be described herein is a secondary battery that obtains a battery capacity using insertion and extraction of an electrode reactant, and includes a positive electrode, a negative electrode, and an electrolytic solution. To prevent precipitation of the electrode reactant on a surface of the negative electrode during charging in the secondary battery, a charge capacity of the negative electrode is greater than a discharge capacity of the positive electrode. In other words, an electrochemical capacity per unit area of the negative electrode is set to be greater than an electrochemical capacity per unit area of the positive electrode.

The electrode reactant is not limited to a particular kind, and is a light metal such as an alkali metal or an alkaline earth metal. Examples of the alkali metal include lithium, sodium, and potassium, and examples of the alkaline earth metal include beryllium, magnesium, and calcium.

Examples are given below of a case where the electrode reactant is lithium. A secondary battery that obtains a battery capacity using lithium insertion and extraction is a so-called lithium-ion secondary battery. In the lithium-ion secondary battery, lithium is inserted and extracted in an ionic state.

Here, a secondary battery of a laminated-film type will be described. The secondary battery of the laminated-film type uses, as an outer package member for containing a battery device, an outer package member having flexibility or softness.

FIG. 1 is a perspective view of a configuration of the secondary battery of the laminated-film type, and FIG. 2 illustrates a sectional view of a configuration of a wound electrode body 10 illustrated in FIG. 1. FIG. 3 is a sectional view of a configuration of a positive electrode active material particle 1. It should be understood that FIG. 1 illustrates a state in which the wound electrode body 10 and an outer package film 20 are separated away from each other, and FIG. 2 illustrates only a portion of the wound electrode body 10.

In the secondary battery, as illustrated in FIG. 1, a wound battery device (i.e., the wound electrode body 10) is contained inside the outer package film 20 having a pouch shape. To the wound electrode body 10, a positive electrode lead 14 and a negative electrode lead 15 are coupled. The positive electrode lead 14 and the negative electrode lead 15 are led out in respective directions that are common to each other, from inside to outside the outer package film 20.

The outer package film 20 is an outer package member that contains the wound electrode body 10. The outer package film 20 is a member having a shape of a single film, and is foldable in a direction of an arrow R (a chain line) illustrated in FIG. 1. The outer package film 20 has a depression part 20U for containing the wound electrode body 10. The depression part 20U is a so-called deep drawn part.

Here, the outer package film 20 is a three-layer laminated film including a fusion-bonding layer, a metal layer, and a surface protective layer that are stacked in this order from an inner side. In a state in which the outer package film 20 is folded, outer edges of the fusion-bonding layer are fusion-bonded to each other. The fusion-bonding layer includes a polymer compound such as polypropylene. The metal layer includes a metal material such as aluminum. The surface protective layer includes a polymer compound such as nylon. The number of layers of the outer package film 20 is not limited to three, and may be one, two, or four or more.

A sealing film 21 is disposed between the outer package film 20 and the positive electrode lead 14. A sealing film 22 is disposed between the outer package film 20 and the negative electrode lead 15. The sealing film 21 and the sealing film 22 are each a member that prevents entry of outside air, and each include a polyolefin resin. The polyolefin resin has adherence to both the positive electrode lead 14 and the negative electrode lead 15. Examples of the polyolefin resin include polyethylene, polypropylene, modified polyethylene, and modified polypropylene. It should be understood that one or both of the sealing films 21 and 22 may be omitted.

As illustrated in FIGS. 1 and 2, the wound electrode body 10 includes a positive electrode 11, a negative electrode 12, a separator 13, and an unillustrated electrolytic solution. The electrolytic solution is a liquid electrolyte. The wound electrode body 10 has a structure in which the positive electrode 11 and the negative electrode 12 are stacked on each other with the separator 13 interposed therebetween, and the stack of the positive electrode 11, the negative electrode 12, and the separator 13 is wound. The positive electrode 11, the negative electrode 12, and the separator 13 are each impregnated with the electrolytic solution.

As illustrated in FIG. 2, the positive electrode 11 includes a positive electrode current collector 11A, and two positive electrode active material layers 11B each provided on respective sides of the positive electrode current collector 11A. However, the positive electrode active material layer 11B may be provided only on one side of the positive electrode current collector 11A.

The positive electrode current collector 11A includes one or more of electrically conductive materials including, without limitation, aluminum, nickel, and stainless steel. The positive electrode active material layer 11B includes one or more of positive electrode active materials into which lithium is inserted and from which lithium is extracted. The positive electrode active material layer 11B may further include a material such as a positive electrode binder or a positive electrode conductor.

The positive electrode active material is in a form of particles. Thus, the positive electrode active material layer 11B includes positive electrode active material particles 1 as illustrated in FIG. 3. FIG. 3 illustrates, however, only one positive electrode active material particle 1. The positive electrode active material particle 1 includes a layered rock-salt lithium composite oxide represented by Formula (1) and a spinel metal oxide represented by Formula (2). Only one layered rock-salt lithium composite oxide may be used, or two or more layered rock-salt lithium composite oxides may be used. Similarly, only one spinel metal oxide may be used, or two or more spinel metal oxides may be used.

$$Li_xCo_aNi_bM_{(1-a-b)}O_2 \qquad (1)$$

where:
M is at least one of magnesium (Mg), aluminum (Al), titanium (Ti), manganese (Mn), yttrium (Y), zirconium (Zr), molybdenum (Mo), or tungsten (W); and x, a, and b satisfy $0.9 \le x \le 1.2$, $0 \le a \le 1$, and $0 \le b \le 1$, respectively.

$$X_3O_4 \qquad (2)$$

where X includes at least one of cobalt (Co), aluminum, magnesium, or zinc (Zn).

As is apparent from Formula (1), the layered rock-salt lithium composite oxide is an oxide that includes, as constituent elements: lithium (Li); cobalt (Co), nickel (Ni), or both; and one or more of additional metal elements (M). The layered rock-salt lithium composite oxide has a layered rock-salt crystal structure. The layered rock-salt lithium composite oxide may include no additional metal element (M) as a constituent element.

The layered rock-salt lithium composite oxide is not limited to a particular kind as long as the condition indicated in Formula (1) is satisfied. Specific examples of the layered rock-salt lithium composite oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

As is apparent from Formula (2), the spinel metal oxide is an oxide that includes, as a constituent element or constituent elements, one or more of metal elements (X), and has a spinel crystal structure.

The spinel metal oxide is not limited to a particular kind as long as the condition indicated in Formula (2) is satisfied. Specific examples of the spinel metal oxide include $Co_3O_4$, $Al_3O_4$, $Mg_3O_4$, and $Zn_3O_4$.

It should be understood that the positive electrode active material particle 1 has therein the spinel metal oxide on a surface of a particle including the layered rock-salt lithium composite oxide. In other words, as illustrated in FIG. 3, a covering layer 3 including the spinel metal oxide is provided on a surface of a core particle 2 including the layered rock-salt lithium composite oxide.

A border between the core particle 2 and the covering layer 3 may be clear or may not necessarily be clear. The case where the border is clear means a case where a composition of the core particle 2 and a composition of the covering layer 3 are different from each other, resulting in that the border between the core particle 2 and the covering layer 3 is clearly determined owing to the difference in the compositions. In contrast, the case where the border is not clear means a case where one or more of the constituent elements of the core particle 2 are diffused into the covering layer 3 and one or more of the constituent elements of the covering layer 3 are diffused into the core particle 2, resulting in that the border between the core particle 2 and the covering layer 3 is not clearly determined owing to the diffusing phenomena occurring in the core particle 2 and the covering layer 3. For this reason, FIG. 3 indicates the border between the core particle 2 and the covering layer 3 by a dashed line.

It should be understood that, in the case where the border is not clear, only one or more of the constituent elements of the core particle 2 may diffuse into the covering layer 3 and one or more of the constituent elements of the covering layer 3 may not necessarily diffuse into the core particle 2, or one or more of the constituent elements of the core particle 2 may not necessarily diffuse into the covering layer 3 and only one or more of the constituent elements of the covering layer 3 may diffuse into the core particle 2.

Upon manufacturing the positive electrode active material particle 1 of the case where the border between the core particle 2 and the covering layer 3 is not clear, the spinel metal oxide in a powdered state is deposited on the surface of the core particle 2 (the layered rock-salt lithium composite oxide), following which the core particle 2 on which the spinel metal oxide is deposited is fired. Details of a method of manufacturing the positive electrode active material particle 1 will be described later.

Here, used is the positive electrode active material described above, that is, the positive electrode active material particle 1 having therein the spinel metal oxide on the surface of the particle including the layered rock-salt lithium composite oxide. A reason for this is that a kind (a state) of the positive electrode active material is made appropriate in a relationship with components (a chain carboxylic acid ester and a cyclic ether) in the electrolytic solution to be described later. This suppresses the decomposition reaction of the electrolytic solution while securing entering and exiting of lithium upon charging and discharging. Details of the advantages described here will be described later.

A content of the spinel metal oxide in the positive electrode active material particle 1 is not particularly limited; however, in particular, the content is preferably from 80 ppm to 1200 ppm both inclusive. A reason for this that the content of the spinel metal oxide is made appropriate, and this further suppresses the decomposition reaction of the electrolytic solution while securing entering and exiting of lithium.

It should be understood that the positive electrode active material layer 21B may include the above-described positive electrode active material (the positive electrode active material particle 1) and one or more of other positive electrode active materials into which lithium is inserted and from which lithium is extracted.

The other positive electrode active materials are not limited to particular kinds, and are each a lithium-containing compound such as a lithium-containing transition metal compound. It should be understood that the positive electrode active material (the positive electrode active material particle 1) described above is excluded from the lithium-containing compound to be described here.

The lithium-containing transition metal compound includes lithium and one or more of transition metal elements as constituent elements, and may further include one or more of other elements as a constituent element or constituent elements. The other elements may be any elements other than a transition metal element, and are not limited to a particular kind. In particular, the other elements are preferably those belong to groups 2 to 15 in the long period periodic table of elements. It should be understood that the lithium-containing transition metal compound may be an oxide or may be one of a phosphoric acid compound, a silicic acid compound, and a boric acid compound.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$, and $LiMn_2O_4$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. The positive electrode conductor may be a material such as a metal material or an electrically conductive polymer as long as the material has an electrically conductive property.

As illustrated in FIG. 2, the negative electrode 12 includes a negative electrode current collector 12A, and two negative electrode active material layers 12B each provided on respective sides of the negative electrode current collector 12A. However, the negative electrode active material layer 12B may be provided only on one side of the negative electrode current collector 12A.

The negative electrode current collector 12A includes one or more of electrically conductive materials including, without limitation, copper, aluminum, nickel, and stainless steel. The negative electrode active material layer 12B includes one or more of negative electrode active materials into which lithium is inserted and from which lithium is extracted. The negative electrode active material layer 12B may further include a material such as a negative electrode binder or a negative electrode conductor. Details of each of the negative electrode binder and the negative electrode conductor are similar to details of each of the positive electrode binder and the positive electrode conductor.

The negative electrode active material is not limited to a particular kind, and examples thereof include a carbon material and a metal-based material. Examples of the carbon material include graphitizable carbon, non-graphitizable carbon, and graphite. Examples of the graphite include natural graphite and artificial graphite. The metal-based material is a material including, as a constituent element or constituent elements, one or more of metal elements and metalloid elements that are each able to form an alloy with lithium. Examples of the metal element and the metalloid element include silicon and tin. The metal-based material may be, for example, a simple substance, an alloy, a compound, or a mixture of two or more thereof.

Specific examples of the metal-based material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\le 2$ or $0.2<v<1.4$), $LiSiO$, $SnO_2$($0<w\le 2$), $SnSiO_3$, $LiSnO$, and $Mg_2Sn$.

A method of forming the negative electrode active material layer 12B is not particularly limited, and includes one or more of methods including, without limitation, a coating method, a vapor-phase method, a liquid-phase method, a thermal spraying method, and a firing (sintering) method.

As illustrated in FIG. 2, the separator 13 is interposed between the positive electrode 11 and the negative electrode 12. The separator 13 is an insulating porous film that allows lithium to pass therethrough while preventing contact (short circuiting) between the positive electrode 11 and the negative electrode 12. The separator 13 may be a single-layer film including one porous film, or may be a multi-layer film including one or more porous films that are stacked on each other. The porous film includes one or more of polymer compounds including, without limitation, polytetrafluoroethylene, polypropylene, and polyethylene.

The electrolytic solution includes a chain carboxylic acid ester and a cyclic ether. Only one chain carboxylic acid ester may be used, or two or more chain carboxylic acid esters may be used. Similarly, only one cyclic ether may be used, or two or more cyclic ethers may be used.

As described above, the term "chain carboxylic acid ester" is a generic term for a condensation reaction product of a carboxylic acid (an oxo acid) and an alcohol, i.e., a chain compound having a so-called ester bond. Carbon number of the chain carboxylic acid ester as a whole is not particularly limited.

In addition, as described above, the term "cyclic ether" is a generic term for a cyclic hydrocarbon compound having an ether bond. The number of ether bonds included in the cyclic ether is not particularly limited. The number of ether bonds may be only one, or two or more. Carbon number of the cyclic ether as a whole is not particularly limited as long as the cyclic ether is able to form a ring structure while having an ether bond. For this reason, a ring structure of the cyclic hydrocarbon compound may be a three-membered ring, a four-membered ring, a five-membered ring, a six-membered ring, or another ring.

A reason why the electrolytic solution includes the chain carboxylic acid ester and the cyclic ether is that, in a case where the above-described positive electrode active material particle 1 is included in the positive electrode 11, a satisfactory film owing to a synergetic action of the chain carboxylic acid ester and the cyclic ether is formed on, for example, a surface of the negative electrode 12. This suppresses the decomposition reaction of the electrolytic solution while securing entering and exiting of lithium upon charging and discharging, as described above. It should be understood that details of the advantages described here will be described later, as described above.

The chain carboxylic acid ester is not limited to a particular kind. Therefore, the chain carboxylic acid ester may be a formic acid ester, an acetic acid ester, a propionic acid ester, a butyric acid ester, a valeric acid ester, or any other chain carboxylic acid ester. Further, the chain carboxylic acid ester may be a chain carboxylic acid methyl ester, may be a chain carboxylic acid ethyl ester, may be a chain carboxylic acid propyl ester, may be a chain carboxylic acid butyl ester, may be a chain carboxylic acid pentyl ester, or may be other than those. It should be understood that each of the propyl group and the butyl group may have a straight-chain structure or a branched structure.

Specifically, examples of the formic acid ester include methyl formate, ethyl formate, propyl formate, butyl formate, and pentyl formate. Examples of the acetic acid ester include methyl acetate, ethyl acetate, propyl acetate, butyl acetate, and pentyl acetate. Examples of the propionic acid ester include methyl propionate, ethyl propionate, propyl propionate, butyl propionate, and pentyl propionate. Examples of the butyric acid ester include methyl butyrate, ethyl butyrate, propyl butyrate, butyl butyrate, and pentyl butyrate. Examples of the valeric acid ester include methyl valerate, ethyl valerate, propyl valerate, butyl valerate, and pentyl valerate.

In particular, it is preferable that the chain carboxylic acid ester include one or more of compounds each represented by Formula (3). A reason for this is that a satisfactory film is easily formed on, for example, the surface of the negative electrode 12.

$$R1—C(=O)—O—R2 \tag{3}$$

where:
each of R1 and R2 is an alkyl group;
R1 has carbon number from 2 to 4 both inclusive; and
R2 has carbon number from 1 to 4 both inclusive.

The carbon number of R1 is from 2 to 4 both inclusive; thus, the compound represented by Formula (3) is one of the acetic acid ester, the propionic acid ester, and the butyric acid ester. In addition, the carbon number of R2 is from 1 to 4 both inclusive; thus, the compound represented by Formula (3) is one of the chain carboxylic acid methyl ester, the chain carboxylic acid ethyl ester, the chain carboxylic acid propyl ester, and the chain carboxylic acid butyl ester. It should be understood that each of the propyl group and the butyl group may have a straight-chain structure or a branched structure.

Specific examples of the compound represented by Formula (3) are as follows. Specific examples of the acetic acid ester include methyl acetate, ethyl acetate, propyl acetate, and butyl acetate. Specific examples of the propionic acid ester include methyl propionate, ethyl propionate, propyl propionate, and butyl propionate. Specific examples of the butyric acid ester include methyl butyrate, ethyl butyrate, propyl butyrate, and butyl butyrate.

The electrolytic solution includes a solvent to be described later, and the solvent includes the chain carboxylic acid ester. A content of the chain carboxylic acid ester in the solvent is not particularly limited; however, in particular, the content is preferably from 10 wt % to 40 wt % both inclusive. A reason for this is that a satisfactory film is easily formed on, for example, the surface of the negative electrode 12. It should be understood that the content of the chain carboxylic acid ester described here is a value measured (analyzed) after a stabilization process of the secondary battery to be described later is performed, that is, after a solid electrolyte interphase (SEI) film is formed. The content of the chain carboxylic acid ester is measurable by analyzing the electrolytic solution using inductively coupled plasma (ICP) emission spectrometry.

The cyclic ether is not limited to a particular kind. Therefore, the cyclic ether may be a three-membered ring having one ether bond, a four-membered ring having one ether bond, a four-membered ring having two ether bonds, a five-membered ring having one ether bond, a five-membered ring having two ether bonds, a six-membered ring having one ether bond, a six-membered ring having two ether bonds, or any other ring.

Further, the cyclic ether may include one or more of unsaturated carbon bonds (a carbon-carbon double bond, a carbon-carbon triple bond, or both) or may include two or more ring structures.

In particular, it is preferable that the cyclic ether include one or more compounds each represented by one of Formula (4-1), Formula (4-2), and Formula (4-3). A reason for this is that a satisfactory film is easily formed on, for example, the surface of the negative electrode 12.

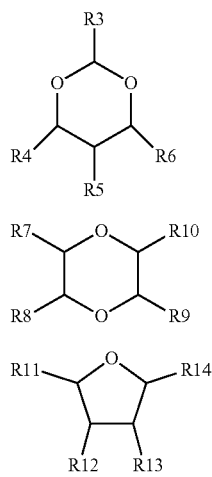

(4-1)

(4-2)

(4-3)

where each of R3 to R14 is one of a hydrogen group and an alkyl group.

The compound represented by Formula (4-1) includes 1,3-dioxane or a derivative thereof. The compound represented by Formula (4-2) includes 1,4-dioxane or a derivative thereof. The compound represented by Formula (4-3) includes tetrahydrofuran or a derivative thereof. Carbon number of the alkyl group is not particularly limited. It should be understood that the alkyl group may have a straight-chain structure or a branched structure.

In particular, the carbon number of the alkyl group is preferably 3 or less, and more preferably 2 or less. A reason for this is that properties including, without limitation, solubility and compatibility of the cyclic ether improve.

Specific examples of the cyclic ether are as follows. Specific examples of the compound represented by Formula (4-1) include 1,3-dioxane, 2-methyl-1,3-dioxane, and 2,2-diethyl-1,3-dioxane. Specific examples of the compound represented by Formula (4-2) include 1,4-dioxane. Specific examples of the compound represented by Formula (4-3) include tetrahydrofuran, methyltetrahydrofuran, dimethyl tetrahydrofuran, dimethoxytetrahydrofuran, ethoxytetrahydrofuran, furan, and methylfuran.

Specific examples of other cyclic ether include dioxolane, methyldioxolane, dimethyldioxolane, vinyldioxolane, methoxydioxolane, ethylmethyldioxolane, oxane, trioxane, dihydropyran, and tetrahydropyran.

A content of the cyclic ether in the electrolytic solution is not particularly limited; however, in particular, the content is preferably from 0.1 wt % to 3.0 wt % both inclusive. A reason for this is that a satisfactory film is easily formed, for example, on the surface of the negative electrode 12. It should be understood that the content of the cyclic ether described here is a value measured (analyzed) after the stabilization process of the secondary battery is performed, as with the content of the chain carboxylic acid ester described above. The content of the cyclic ether is measurable by analyzing the electrolytic solution using the ICP emission spectrometry.

The electrolytic solution may further include the solvent and an electrolyte salt. Only one solvent may be used, or two or more solvents may be used. Similarly, only one electrolyte salt may be used, or two or more electrolyte salts may be used. It should be understood that each of the chain carboxylic acid ester and the cyclic ether described above is excluded from the solvent to be described here.

The solvent includes a non-aqueous solvent (an organic solvent), and the electrolytic solution including the non-aqueous solvent is a so-called non-aqueous electrolytic solution. The solvent includes the chain carboxylic acid ester, as described above.

Examples of the non-aqueous solvent include esters and ethers. Specific examples thereof include a carbonic-acid-ester-based compound and a lactone-based compound.

Examples of the carbonic-acid-ester-based compound include a cyclic carbonic acid ester and a chain carbonic acid ester. Examples of the cyclic carbonic acid ester include ethylene carbonate and propylene carbonate. Examples of the chain carbonic acid ester include dimethyl carbonate, diethyl carbonate, and methyl ethyl carbonate. Examples of the lactone-based compound include γ-butyrolactone and γ-valerolactone. Examples of the ethers other than the lactone-based compounds described above include 1,2-dimethoxyethane, tetrahydrofuran, 1,3-dioxolane, and 1,4-dioxane.

Examples of the non-aqueous solvent further include an unsaturated cyclic carbonic acid ester, a halogenated carbonic acid ester, a sulfonic acid ester, a phosphoric acid ester, an acid anhydride, a nitrile compound, and an isocyanate compound. A reason for this is that chemical stability of the electrolytic solution improves.

Specific examples of the unsaturated cyclic carbonic acid ester include vinylene carbonate (1,3-dioxol-2-one), vinylethylene carbonate (4-vinyl-1,3-dioxolane-2-one), and methylene ethylene carbonate (4-methylene-1,3-dioxolane-2-one). Examples of the halogenated carbonic acid ester include fluoroethylene carbonate (4-fluoro-1,3-dioxolane-2-one) and difluoroethylene carbonate (4,5-difluoro-1,3-dioxolane-2-one). Examples of the sulfonic acid ester include 1,3-propane sultone. Examples of the phosphoric acid ester include trimethyl phosphate and triethyl phosphate. Examples of the acid anhydride include a cyclic carboxylic acid anhydride, a cyclic disulfonic acid anhydride, and a cyclic carboxylic acid sulfonic acid anhydride. Examples of the cyclic carboxylic acid anhydride include succinic anhydride, glutaric anhydride, and maleic anhydride. Examples of the cyclic disulfonic acid anhydride include ethane disulfonic anhydride and propane disulfonic anhydride.

Examples of the cyclic carboxylic acid sulfonic acid anhydride include sulfobenzoic anhydride, sulfopropionic anhydride, and sulfobutyric anhydride. Examples of the nitrile compound include acetonitrile, succinonitrile, and adiponitrile. Examples of the isocyanate compound include hexamethylene diisocyanate.

The electrolyte salt includes a light metal salt such as a lithium salt. Examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethanesulfonyl)imide ($LiN(CF_3SO_2)_2$), lithium tris(trifluoromethanesulfonyl)methide ($LiC(CF_3SO_2)_3$), and lithium bis(oxalato)borate ($LiB(C_2O_4)_2$). A content of the electrolyte salt is not particularly limited; however, the content is from 0.3 mol/kg to 3.0 mol/kg both inclusive with respect to the solvent. A reason for this is that a high ion conductivity is obtainable.

The positive electrode lead 14 is coupled to the positive electrode 11 (the positive electrode current collector 11A), and the negative electrode lead 15 is coupled to the negative electrode 12 (the negative electrode current collector 12A). The positive electrode lead 14 includes one or more of electrically conductive materials including, without limitation, aluminum, and the negative electrode lead 15 includes one or more of electrically conductive materials including, without limitation, copper, nickel, and stainless steel. The positive electrode lead 14 and the negative electrode lead 15 each have a shape such as a thin plate shape or a meshed shape.

Upon charging the secondary battery, lithium is extracted from the positive electrode 11, and the extracted lithium is inserted into the negative electrode 12 via the electrolytic solution. Upon discharging the secondary battery, lithium is extracted from the negative electrode 12, and the extracted lithium is inserted into the positive electrode 11 via the electrolytic solution. Upon charging and discharging the secondary battery, lithium is inserted and extracted in an ionic state.

In a case of manufacturing the secondary battery, the positive electrode 11 and the negative electrode 12 are each fabricated and the electrolytic solution is prepared, following which the secondary battery is assembled using the positive electrode 11, the negative electrode 12, and the electrolytic solution, according to a procedure to be described below. As a process of fabricating the positive electrode 11, a description is given related to a case of manufacturing the above-described positive electrode active material particle 1 in which the border between the core particle 2 and the covering layer is not clear.

First, the layered rock-salt lithium composite oxide in a powdered state and the spinel metal oxide in a powdered state are mixed, following which a mixture thereof is fired. Thus, the spinel metal oxide (the covering layer 3) is fixed on the surface of the particle (the core particle 2) of the layered rock-salt lithium composite oxide, thereby obtaining the positive electrode active material particle 1. In this case, a mixture ratio (a weight ratio) between the layered rock-salt lithium composite oxide and the spinel metal oxide is adjusted, which makes it possible to control the content (ppm) of the spinel metal oxide in the positive electrode active material particle 1. Conditions including, for example, a firing temperature and a firing time may each be set to any value. Thereafter, the positive electrode active material particle 1 may be pulverized using a grinding machine such as a ball mill.

Upon obtaining the positive electrode active material particle 1, it is also possible to manufacture the positive electrode active material particle 1 in such a manner that the border between the core particle 2 and the covering layer is clear by adjusting the conditions including, for example, the firing temperature and the firing time.

Thereafter, the positive electrode active material is (the positive electrode active material particles 1 are) mixed with, on an as-needed basis, a material such as the positive electrode binder or the positive electrode conductor to thereby obtain a positive electrode mixture. Thereafter, the positive electrode mixture is put into a slurry solvent such as an organic solvent to thereby prepare a paste positive electrode mixture slurry. Lastly, the positive electrode mixture slurry is applied on both sides of the positive electrode current collector 11A to thereby form the positive electrode active material layers 11B. Thereafter, the positive electrode active material layers 11B may be compression-molded by means of a machine such as a roll pressing machine. In this case, the positive electrode active material layers 11B may be heated. The positive electrode active material layers 11B may be compression-molded multiple times. The positive electrode active material layer 11B is thus formed on each of both sides of the positive electrode current collector 11A. In this manner, the positive electrode 11 is fabricated.

The negative electrode active material layers 12B are formed on both sides of the negative electrode current collector 12A by a procedure similar to the fabrication procedure of the positive electrode 11 described above. Specifically, the negative electrode active material is mixed with, on an as-needed basis, a material such as the negative electrode binder or the negative electrode conductor to thereby obtain a negative electrode mixture. Thereafter, the negative electrode mixture is put into a slurry solvent such as an organic solvent to thereby prepare a paste negative electrode mixture slurry. It should be understood that the slurry solvent is not limited to the organic solvent, and may be an aqueous solvent such as pure water. Thereafter, the negative electrode mixture slurry is applied on both sides of the negative electrode current collector 12A to thereby form the negative electrode active material layers 12B. Thereafter, the negative electrode active material layers 12B may be compression-molded. The negative electrode active material layer 12B is thus formed on each of both sides of the negative electrode current collector 12A. In this manner, the negative electrode 12 is fabricated.

The electrolyte salt is put into the solvent including the chain carboxylic acid ester, following which the cyclic ester is added to the solvent. This allows each of the chain carboxylic acid ester, the cyclic ether, and the electrolyte salt to be dispersed or dissolved into the solvent. Thus, the electrolytic solution is prepared.

First, the positive electrode lead 14 is coupled to the positive electrode 11 (the positive electrode current collector 11A) by a method such as a welding method, and the negative electrode lead 15 is coupled to the negative electrode 12 (the negative electrode current collector 12A) by a method such as a welding method. Thereafter, the positive electrode 11 and the negative electrode 12 are stacked on each other with the separator 13 interposed therebetween, following which the stack of the positive electrode 11, the negative electrode 12, and the separator 13 are wound to thereby fabricate a wound body.

Thereafter, the wound body is contained inside the depression part 20U and the outer package film 20 is folded, following which outer edges of two sides of the outer package film 20 (the fusion-bonding layer) are bonded to each other by a method such as a thermal fusion bonding method. Thus, the wound body is placed into the pouch-shaped outer package film 20. Thereafter, the electrolytic solution is injected into the pouch-shaped outer package film 20, following which the outer edges of the remaining one side of the outer package film 20 (the fusion-bonding layer) are bonded with each other using a method such as a thermal fusion bonding method. In this case, the sealing film 21 is disposed between the outer package film 20 and the positive electrode lead 14, and the sealing film 22 is disposed between the outer package film 20 and the negative electrode lead 15. The wound body is thereby impregnated with the electrolytic solution. Thus, the wound electrode body 10 is fabricated. Accordingly, the wound electrode body 10 is sealed in the pouch-shaped outer package film 20. As a result, the secondary battery is assembled.

Lastly, the secondary battery is charged and discharged in order to stabilize a state of the secondary battery. Various conditions including, for example, an environmental temperature, the number of times of charging and discharging (the number of cycles), and charging and discharging conditions may be set freely. The charging and discharging of the secondary battery cause an SEI film to be formed on the surface of the negative electrode 12, for example. This helps to electrochemically stabilize the state of the secondary battery. As a result, the secondary battery of the laminated-film type is completed.

According to the secondary battery of the embodiment, the positive electrode active material particle 1 of the positive electrode 11 has therein the spinel metal oxide on the surface of the particle including the layered rock-salt lithium composite oxide, and the electrolytic solution includes the chain carboxylic acid ester and the cyclic ether.

In this case, configuration of the components (the chain carboxylic acid ester and the cyclic ether) in the electrolytic solution is made appropriate in the relationship with configuration of the positive electrode active material particle 1. The satisfactory film owing to the synergetic action of the chain carboxylic acid ester and the cyclic ether is thus formed on, for example, a surface of the positive electrode 11.

In detail, in a case where the positive electrode 11 does not include the positive electrode active material particle 1, or more specifically, in a case where the positive electrode 11 includes a common lithium-containing compound such as the lithium-containing transition metal compound as a positive electrode active material, the configuration of the components (the chain carboxylic acid ester and the cyclic ether) in the electrolytic solution is not made appropriate in the relationship with the positive electrode active material.

In this case, the synergetic action of the chain carboxylic acid ester and the cyclic ether is not obtainable. Thus, the satisfactory film owing to the synergetic action is not formed on, for example, the surface of the positive electrode 11. Accordingly, the securing of entering and exiting of lithium and the suppression of the decomposition reaction of the electrolytic solution upon charging and discharging are not achievable at the same time. It is thus difficult to obtain superior battery characteristics.

In contrast, in a case where the positive electrode 11 includes the positive electrode active material particle 1, as described above, the configuration of the components (the chain carboxylic acid ester and the cyclic ether) in the electrolytic solution is made appropriate in the relationship with the configuration of the positive electrode active material particle 1.

In this case, owing to a high reaction potential of the spinel metal oxide, chain carboxylic acid and the cyclic ether react with each other at that reaction potential, which allows the synergistic action of the chain carboxylic acid ester and the cyclic ether to be obtained specifically. Thus, the satisfactory film derived from the chain carboxylic acid ester and the cyclic ether is formed on, for example, the surface of the positive electrode 11. Accordingly, it is possible to obtain advantages utilizing the above-described synergetic action.

Specifically, first, the positive electrode active material particle 1 includes the spinel metal oxide; thus, reduction in a discharge capacity is suppressed even if charging and discharging are repeated. Second, the satisfactory film is formed on, for example, the surface of the positive electrode 11; thus, the decomposition reaction of the electrolytic solution is suppressed on, for example, the surface of the positive electrode 11 which is reactive, and generation of gas due to the decomposition reaction of the electrolytic solution is suppressed. Third, the decomposition reaction of the electrolytic solution is suppressed; thus, deposition of a decomposition product due to the decomposition reaction of the electrolytic solution is suppressed on, for example, the surface of the positive electrode 11, which suppresses an increase in an electric resistance of, for example, the positive electrode 11.

Accordingly, it is possible to secure entering and exiting of lithium and also to suppress the decomposition reaction of the electrolytic solution upon charging and discharging (suppression of the reduction in the discharge capacity and suppression of the increase in the electric resistance). In this case, in particular, even if the secondary battery is used or stored in a severe environment such as a high-temperature environment, it is possible to secure entering and exiting of lithium and also to suppress the decomposition reaction of the electrolytic solution.

In addition, the content of the spinel metal oxide in the positive electrode active material particle 1 may be from 80 ppm to 1200 ppm both inclusive. This further suppresses the decomposition reaction of the electrolytic solution while securing entering and exiting of lithium, which makes it possible to achieve higher effects.

Further, the chain carboxylic acid ester may include one or more of compounds each represented by Formula (3). This allows the satisfactory film to be easily formed on, for example, the surface of the negative electrode 12, which makes it possible to achieve higher effects.

Further, the content of the chain carboxylic acid ester in the solvent may be from 10 wt % to 40 wt % both inclusive. This allows the satisfactory film to be sufficiently easily formed, which makes it possible to achieve higher effects.

Further, the cyclic ether may include one or more of compounds each represented by one of Formula (4-1), Formula (4-2), and Formula (4-3). This allows the satisfactory film to be easily formed on, for example, the surface of the negative electrode 12, which makes it possible to achieve higher effects.

Further, the content of the cyclic ether in the electrolytic solution may be from 0.1 wt % to 3.0 wt % both inclusive. This allows the satisfactory film to be sufficiently easily formed, which makes it possible to achieve higher effects.

Further, the secondary battery may be the lithium-ion secondary battery. This allows a sufficient battery capacity to be obtained stably utilizing lithium insertion and extraction, which makes it possible to achieve higher effects.

Next, a description is given of modifications of the above-described secondary battery. The configuration of the secondary battery is appropriately modifiable as described below. It should be understood that any two or more of the following series of modifications may be combined.

[Modification 1]

The number of positive electrode leads 14 and the number of negative electrode leads 15 are each not particularly limited. In other words, the number of positive electrode leads 14 is not limited to one, and may be two or more, and the number of negative electrode leads 15 is not limited to one, and may be two or more. It is possible to obtained similar effects also in a case where the number of positive electrode leads 14 and the number of negative electrode leads 15 are each changed.

[Modification 2]

The separator 13 which is a porous film is used. However, although not specifically illustrated here, a separator of a stack type including a polymer compound layer may be used instead of the separator 13 which is the porous film.

Specifically, the separator of the stack type includes: a base layer which is the above-described porous film; and a polymer compound layer provided on one side or each of both sides of the base layer. A reason for this is that adherence of the separator to each of the positive electrode 11 and the negative electrode 12 improves to suppress occurrence of positional deviation of the wound electrode body 10. This helps to reduce swelling of the secondary battery even if the decomposition reaction of the electrolytic solution occurs, for example. The polymer compound layer includes a polymer compound such as polyvinylidene difluoride. A reason for this is that such a polymer compound has superior physical strength and is electrochemically stable.

It should be understood that the base layer, the polymer compound layer, or both may each include one or more kinds of particles including, for example, inorganic particles and resin particles. A reason for this is that heat is released by the particles when the secondary battery generates heat, which improves heat resistance and safety of the secondary battery. The inorganic particles are not limited to a particular kind, and examples thereof include aluminum oxide (alumina) particles, aluminum nitride particles, boehmite particles, silicon oxide (silica) particles, titanium oxide (titania) particles, magnesium oxide (magnesia) particles, and zirconium oxide (zirconia) particles.

In a case of fabricating the separator of the stack type, a precursor solution that includes materials including, without limitation, the polymer compound and an organic solvent is prepared, following which the precursor solution is applied on one side or each of both sides of the base layer.

Similar effects are obtainable also in the case where the separator of the stack type is used, as lithium is movable between the positive electrode 11 and the negative electrode 12.

[Modification 3]

The electrolytic solution which is a liquid electrolyte is included. However, although not specifically illustrated here, an electrolyte layer which is a gel electrolyte may be included instead of the electrolytic solution.

In the wound electrode body 10 including the electrolyte layer, the positive electrode 11 and the negative electrode 12 are stacked with the separator 13 and the electrolyte layer interposed therebetween, and the stack of the positive electrode 11, the negative electrode 12, the separator 13, and the electrolyte layer is wound. The electrolyte layer is interposed between the positive electrode 11 and the separator 13, and between the negative electrode 12 and the separator 13.

Specifically, the electrolyte layer includes a polymer compound together with the electrolytic solution. The electrolytic solution is held by the polymer compound in the electrolyte layer. The configuration of the electrolytic solution is as described above. The polymer compound includes, for example, polyvinylidene difluoride. In a case of forming the electrolyte layer, a precursor solution that includes materials including, without limitation, the electrolytic solution, the polymer compound, and an organic solvent is prepared, following which the precursor solution is applied on one side or each of both sides of each of the positive electrode 11 and the negative electrode 12.

Similar effects are obtainable also in the case of including the electrolyte layer, as lithium is movable between the positive electrode 11 and the negative electrode 12 via the electrolyte layer.

Next, a description is given of applications (application examples) of the above-described secondary battery.

The applications of the secondary battery are not particularly limited as long as they are, for example, machines, apparatuses, instruments, devices, or systems (an assembly of a plurality of apparatuses, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic apparatuses including portable electronic apparatuses; portable life appliances; storage devices; electric power tools; battery packs mountable on laptop personal computers or other apparatuses as a detachable power source; medical electronic apparatuses; electric vehicles; and electric power storage systems. Examples of the electronic apparatuses include video cameras, digital still cameras, mobile phones, laptop personal computers, cordless phones, headphone stereos, portable radios, portable televisions, and portable information terminals. Examples of the portable life appliances include electric shavers. Examples of the storage devices include backup power sources and memory cards. Examples of the electric power tools include electric drills and electric saws. Examples of the medical electronic apparatuses include pacemakers and hearing aids. Examples of the electric vehicles include electric automobiles including hybrid automobiles. Examples of the electric power storage systems include home battery systems for accumulation of electric power for emergency, for example. It should be understood that a structure of the secondary battery may be the above-described laminated-film type or a cylindrical type, or may be any other type. Further, multiple secondary batteries may be used as a battery pack and a battery module, for example.

In particular, the battery pack and the battery module are each effectively applied to a relatively large-sized device such as an electric vehicle, an electric power storage system, or an electric power tool. The battery pack, as will be described later, may include a single battery, or may include an assembled battery. The electric vehicle is a vehicle that operates (travels) using the secondary battery as a driving power source, and may be an automobile (such as a hybrid automobile) additionally provided with a driving source other than the secondary battery as described above. The electric power storage system is a system that uses the secondary battery as an electric power storage source. An electric power storage system for home use accumulates electric power in the secondary battery which is an electric power storage source, and therefore, the accumulated electric power may be utilized for using, for example, home electric appliances.

Some application examples of the secondary battery will now be described in detail. The configurations of the application examples described below are each merely an example, and are appropriately modifiable. The type of the secondary battery used in the following application examples is not particularly limited, and may be a laminated-film type or a cylindrical type.

FIG. 4 illustrates a block configuration of a battery pack including a single battery. The battery pack described here is a simple battery pack (a so-called soft pack) including one secondary battery, and is mounted on, for example, an electronic apparatus as typified by a smartphone.

As illustrated in FIG. 4, the battery pack includes an electric power source 61 and a circuit board 62. The circuit board 62 is coupled to the electric power source 61, and includes a positive electrode terminal 63, a negative electrode terminal 64, and a temperature detection terminal (a so-called T terminal) 65.

The electric power source 61 includes one secondary battery. The secondary battery has a positive electrode lead coupled to the positive electrode terminal 63 and a negative electrode lead coupled to the negative electrode terminal 64. The electric power source 61 is able to be coupled to outside through the positive electrode terminal 63 and the negative electrode terminal 64, and is thus able to be charged and discharged through the positive electrode terminal 63 and the negative electrode terminal 64. The circuit board 62 includes a controller 66, a switch 67, a PTC device 68, and a temperature detector 69. However, the PTC device 68 may be omitted.

The controller 66 includes, for example, a central processing unit (CPU) and a memory, and controls an overall operation of the battery pack. The controller 66 detects and controls a use state of the electric power source 61 as necessary.

When a battery voltage of the electric power source 61 (the secondary battery) reaches an overcharge detection voltage or an overdischarge detection voltage, the controller 66 turns off the switch 67. This prevents a charging current from flowing in a current path of the electric power source 61. In addition, when a large current flows during charging or discharging, the controller 66 turns off the switch 67 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 67 includes, for example, a charge control switch, a discharge control switch, a charge diode, and a discharge diode. The switch 67 performs switching between connection and disconnection of the electric power source 61 and an external device in accordance with an instruction from the controller 66. The switch 67 includes, for example, a metal-oxide-semiconductor field-effect transistor (MOSFET) including a metal-oxide semiconductor. The charging/discharging current is detected on the basis of an ON-resistance of the switch 67.

The temperature detector 69 includes a temperature detection device such as a thermistor. The temperature detector 69 measures a temperature of the electric power source 61 using the temperature detection terminal 65, and outputs a result of the temperature measurement to the controller 66. The result of the temperature measurement to be obtained by the temperature detector 69 is used, for example, in a case where the controller 66 performs charging/discharging control upon occurrence of abnormal heat generation or in a case where the controller 66 performs a correction process upon calculating a remaining capacity.

FIG. 5 illustrates a block configuration of a battery pack including an assembled battery. In the following description, reference will be made as necessary to the components of the battery pack including the single battery (see FIG. 4).

As illustrated in FIG. 5, the battery pack includes a positive electrode terminal 81 and a negative electrode terminal 82. Specifically, inside a housing 70, the battery pack includes a controller 71, an electric power source 72, a switch 73, a current measurement section 74, a temperature detector 75, a voltage detector 76, a switch controller 77, a memory 78, a temperature detection device 79, and a current detection resistor 80.

The electric power source 72 includes an assembled battery in which two or more secondary batteries are coupled to each other, and a type of connection of the two or more secondary batteries is not particularly limited. Accordingly, the connection scheme may be in series, may be in parallel, or may be a mixed type of both. For example, the electric power source 72 includes six secondary batteries coupled to each other in two parallel and three series.

Configurations of the controller 71, the switch 73, the temperature detector 75, and the temperature detection device 79 are similar to those of the controller 66, the switch 67, and the temperature detector 69 (the temperature detection device). The current measurement section 74 measures a current using the current detection resistor 80, and outputs a result obtained by measuring the current to the controller 71. The voltage detector 76 measures a battery voltage of the electric power source 72 (the secondary battery) and provides the controller 71 with a result obtained by measuring the voltage that has been subjected to analog-to-digital conversion.

The switch controller 77 controls an operation of the switch 73 in response to signals supplied by the current measurement section 74 and the voltage detector 76. When a battery voltage reaches an overcharge detection voltage or an overdischarge detection voltage, the switch controller 77 turns off the switch 73 (the charge control switch). This prevents a charging current from flowing in a current path of the electric power source 72. This enables the electric power source 72 to perform only discharging through the discharging diode, or only charging through the charging diode. In addition, when a large current flows during charging or discharging, the switch controller 77 blocks the charging current or a discharging current.

The switch controller 77 may be omitted, thereby causing the controller 71 to also operate as the switch controller 77. The overcharge detection voltage and the overdischarge detection voltage are not particularly limited, and are similar to those described above in relation to the battery pack including the single battery.

The memory 78 includes, for example, an electrically erasable programmable read-only memory (EEPROM) which is a non-volatile memory, and the memory 78 stores, for example, numeric values calculated by the controller 71 and information (e.g., an initial internal resistance, a full charge capacity, and a remaining capacity) of the secondary battery measured in the manufacturing process.

The positive electrode terminal 81 and the negative electrode terminal 82 are terminals coupled to, for example, an external device (e.g., a laptop personal computer) which operates using the battery pack, or an external device (e.g., a charger) which is used to charge the battery pack. The electric power source 72 (secondary battery) is able to be charged and discharged through the positive electrode terminal 81 and the negative electrode terminal 82.

FIG. 6 illustrates a block configuration of a hybrid automobile which is an example of the electric vehicle. As illustrated in FIG. 6, inside a housing 83, the electric vehicle includes a controller 84, an engine 85, an electric power source 86, a motor 87, a differential unit 88, an electric generator 89, a transmission 90, a clutch 91, inverters 92 and 93, and sensors 94. The electric vehicle also includes: a front wheel drive shaft 95 and a pair of front wheels 96 that are coupled to the differential unit 88 and the transmission 90; and a rear wheel drive shaft 97 and a pair of rear wheels 98.

The electric vehicle is configured to travel by using one of the engine 85 and the motor 87 as a driving source. The engine 85 is a major power source, such as a gasoline engine. In a case where the engine 85 is used as a power source, a driving force (a rotational force) of the engine 85 is transmitted to the front wheels 96 and the rear wheels 98 via the differential unit 88, the transmission 90, and the clutch 91, which are driving parts. It should be understood that the rotational force of the engine 85 is transmitted to the electric generator 89, thereby causing the electric generator 89 to generate alternating-current (AC) power by utilizing the rotational force and also causing the AC power to be converted into direct-current (DC) power via the inverter 93. Thus, the DC power is accumulated in the electric power source 86. In contrast, in a case where the motor 87 which is a converter is used as a power source, the power (DC power) supplied from the electric power source 86 is converted into the AC power via the inverter 92. Thus, the motor 87 is driven by utilizing the AC power. The driving force (the rotational force) converted from the electric power by the motor 87 is transmitted to the front wheels 96 and the rear wheels 98 through the differential unit 88, the transmission 90, and the clutch 91, which are the driving parts.

When the electric vehicle is decelerated via a brake mechanism, the resistance force at the time of deceleration is transmitted as the rotational force to the motor 87. Thus, the motor 87 may generate the AC power by utilizing the rotational force. The AC power is converted into the DC power via the inverter 92, and DC regenerative power is accumulated in the electric power source 86.

The controller 84 includes, for example, a CPU, and controls an overall operation of the electric vehicle. The electric power source 86 includes one or more secondary batteries and is coupled to an external electric power source. In this case, the electric power source 86 may accumulate electric power by being supplied with electric power from the external electric power source. The sensors 94 are used to control the number of revolutions of the engine 85 and to control an angle of a throttle valve (a throttle angle). The sensors 94 include one or more of sensors including, without limitation, a speed sensor, an acceleration sensor, and an engine speed sensor.

The case where the electric vehicle is a hybrid automobile is described as an example; however, the electric vehicle may be a vehicle (an electric vehicle) that operates using only the electric power source 86 and the motor 87 and not using the engine 85.

Although not specifically illustrated here, other application examples are also conceivable as application examples of the secondary battery.

Specifically, the secondary battery is applicable to an electric power storage system. The electric power storage system includes, inside a building such as a residential house or a commercial building: a controller; an electric power source including one or more secondary batteries; a smart meter; and a power hub.

The electric power source is coupled to an electric device such as a refrigerator installed inside the building, and is able to be coupled to an electric vehicle such as a hybrid automobile stopped outside the building. Further, the electric power source is coupled, via the power hub, to a home power generator such as a solar power generator installed at the building, and is also coupled, via the smart meter and the power hub, to a centralized power system of an external power station such as a thermal power station.

Alternatively, the secondary battery is applicable to an electric power tool such as an electric drill or an electric saw. The electric power tool includes, inside a housing to which a movable part such as a drilling part or a saw blade part is attached: a controller; and an electric power source including one or more secondary batteries.

EXAMPLES

A description is given of Examples of the technology below.

Experiment Examples 1-1 to 1-8

Secondary batteries (lithium-ion secondary batteries) of the laminated-film type illustrated in FIGS. 1 and 2 were fabricated, following which battery characteristics of the secondary batteries were evaluated as described below.

The secondary batteries were fabricated in accordance with the following procedure.

First, layered rock-salt lithium composite oxide powder (lithium cobalt oxide ($LiCoO_2$)) and spinel metal oxide powder (cobalt oxide ($Co_3O_4$)) were prepared, and were thereafter mixed, thereby obtaining mixed powder. In this case, a mixture ratio between the layered rock-salt lithium composite oxide powder and the spinel metal oxide powder was adjusted in such a manner that the content of the spinel metal oxide in the mixed powder was 600 ppm. Thus, the spinel metal oxide was deposited on a surface of a particle of the layered rock-salt lithium composite oxide, thereby obtaining a deposited mixture.

Thereafter, the deposited mixture was fired at a firing temperature of 800° C. for a firing time of 3 hours under an air atmosphere. Thus, the spinel metal oxide was fixed on the surface of the particle of the layered rock-salt lithium composite oxide, thereby obtaining the positive electrode active material particle 1 including the core particle 2 (the layered rock-salt lithium composite oxide) and the covering layer 3 (the spinel metal oxide). In the positive electrode active material particle 1, one or more of the constituent elements of the core particle 2 were diffused into the covering layer 3 and one or more of the constituent elements of the covering layer 3 were diffused into the core particle 2. The content (ppm) of the spinel metal oxide in the positive electrode active material particle 1 was as described in Table 1.

Thereafter, 91 parts by mass of the positive electrode active material (the positive electrode active material particles 1), 3 parts by mass of the positive electrode binder (polyvinylidene difluoride), and 6 parts by mass of the positive electrode conductor (carbon black) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on both sides of the positive electrode current collector 11A (a band-shaped aluminum foil having a thickness of 12 µm) by means of a coating apparatus, following which the applied positive electrode mixture slurry was dried to thereby form the positive electrode active material layers 11B. Lastly, the positive electrode active material layers 11B were compression-molded by means of a roll pressing machine. Thus, the positive electrode active material layer 11B was formed on each of both sides of the positive electrode current collector 11A, thereby fabricating the positive electrode 11.

For comparison, the positive electrode 11 was fabricated in accordance with a similar procedure except that the lithium-containing compound (lithium cobalt oxide serving as the lithium-containing transition metal compound) was used as the positive electrode active material. The positive electrode active material did not have the spinel metal oxide (cobalt oxide) fixed on the surface of the particle of the layered rock-salt lithium composite oxide (lithium cobalt oxide).

First, 98 parts by mass of the negative electrode active material (artificial graphite serving as a carbon material), 1.5 parts by mass of the negative electrode binder (a styrene butadiene rubber), and 0.5 parts by mass of a thickener (carboxymethyl cellulose) were mixed with each other to thereby obtain a negative electrode mixture. Thereafter, the negative electrode mixture was put into an aqueous solvent (pure water), following which the aqueous solvent was stirred to thereby prepare a paste negative electrode mixture slurry. Thereafter, the negative electrode mixture slurry was applied on both sides of the negative electrode current collector 12A (a band-shaped copper foil having a thickness of 15 µm) by means of a coating apparatus, following which the applied negative electrode mixture slurry was dried to thereby form the negative electrode active material layers 12B. Lastly, the negative electrode active material layers 12B were compression-molded by means of a roll pressing machine. Thus, the negative electrode active material layer 12B was formed on each of both sides of the negative electrode current collector 12A, thereby fabricating the negative electrode 12.

First, the solvent was prepared. Used as the solvent were ethylene carbonate and propylene carbonate each serving as the carbonic-acid-ester-based compound (the cyclic carbonic acid ester), and ethyl propionate (EP) serving as the chain carboxylic acid ester. A mixture ratio (a weight ratio) between ethylene carbonate, propylene carbonate, and ethyl propionate in the solvent was set to 40:40:20.

Thereafter, the electrolyte salt (lithium hexafluorophosphate ($LiPF_6$)) was added to the solvent, following which the solvent was stirred. The content of the electrolyte salt was set to 1 mol/l (=1 $mol/dm^3$) kg with respect to the solvent.

Lastly, the cyclic ether (1,3-dioxane (DOX1) which is a compound represented by Formula (4-1)) was added to the solvent including the electrolyte salt, following which the solvent was stirred. Thus, the electrolyte salt, the chain carboxylic acid ester, and the cyclic ether were each dispersed or dissolved into the solvent, thereby preparing the electrolytic solution.

For comparison, the electrolytic solution was prepared in accordance with a similar procedure except that the chain carboxylic acid ester, the cyclic ether, or both were not used. That is, the electrolytic solution included only one of the chain carboxylic acid ester and the cyclic ether, or included neither the chain carboxylic acid ester nor the cyclic ether.

First, the positive electrode lead 14 including aluminum was welded to the positive electrode current collector 11A, and the negative electrode lead 15 including copper was welded to the negative electrode current collector 12A. Thereafter, the positive electrode 11 and the negative electrode 12 were stacked on each other with the separator 13 (a fine-porous polyethylene film having a thickness of 15 µm) interposed therebetween, following which the stack of the positive electrode 11, the negative electrode 12, and the separator 13 was wound, to thereby fabricate a wound body.

Thereafter, the outer package film 20 was folded in such a manner as to sandwich the wound body contained in the depression part 20U, following which the outer edges of two sides of the outer package film 20 were thermal fusion bonded to each other. Thus, the wound body was placed into the pouch-shaped outer package film 20. As the outer package film 20, an aluminum laminated film was used in which a fusion-bonding layer (a polypropylene film having a thickness of 30 µm), a metal layer (an aluminum foil having a thickness of 40 µm), and a surface protective layer (a nylon film having a thickness of 25 µm) were stacked in this order from an inner side.

Thereafter, the electrolytic solution was injected into the pouch-shaped outer package film 20, following which the outer edges of one of the remaining sides of the outer package film 20 were thermal fusion bonded to each other in a reduced-pressure environment. In this case, the sealing film 21 (a polypropylene film having a thickness of 5 µm) was interposed between the outer package film 20 and the positive electrode lead 14, and the sealing film 22 (a polypropylene film having a thickness of 5 µm) was interposed between the outer package film 20 and the negative electrode lead 15. Accordingly, the wound body was impregnated with the electrolytic solution, thereby forming the wound electrode body 10. Thus, the wound electrode body 10 was sealed in the outer package film 20. As a result, the secondary battery was assembled.

Lastly, the secondary battery was charged and discharged for one cycle in an ambient temperature environment at a temperature of 23° C. in order to stabilize a state of the secondary battery. Charging and discharging conditions were similar to those for a case of examining a cyclability characteristic to be described later. The charging and discharging of the secondary battery caused an SEI film to be formed on the surface of the negative electrode 12, for example. Thus, the secondary battery of the laminated-film type was completed.

The content (wt %) of the chain carboxylic acid ester in the solvent and the content (wt %) of the cyclic ether in the electrolytic solution after the stabilization of the state of the secondary battery (after the formation of the SEI film) were as described in Table 1.

Evaluation of battery characteristics (a swelling characteristic, a load characteristic, and a cyclability characteristic) of the secondary batteries revealed the results described in Table 1.

In a case of examining the swelling characteristic, first, a thickness (a pre-storage thickness) of the secondary battery was measured in an ambient temperature environment at a temperature of 23° C.

Thereafter, the secondary battery was charged, following which the charged secondary was stored for a storing time of 14 days in a thermostatic chamber at a temperature of 60° C. Upon charging, the secondary battery was charged with a constant current of 0.1 C until a voltage reached 4.4 V, and was thereafter charged with a constant voltage of 4.4 V until a current reached 0.05 C. It should be understood that 0.1 C is a value of a current that causes a battery capacity (a theoretical capacity) to be completely discharged in 10 hours, and 0.05 C is a value of a current that causes the battery capacity to be completely discharged in 20 hours. Thereafter, the thickness (the post-storage thickness) of the secondary battery was measured again in the thermostatic chamber.

Lastly, the following was calculated: swelling rate (%)= [(post-storage thickness−pre-storage thickness)/pre-storage thickness]×100.

In a case of examining the load characteristic, first, the secondary battery was charged and discharged in an ambient temperature environment at a temperature of 23° C., to thereby measure a discharge capacity (a pre-loaded-discharging discharge capacity). A charging condition was similar to the condition of the case of examining the swelling characteristic. Upon discharging, the secondary battery was discharged with a constant current of 0.1 C until the voltage reached 3.0 V.

Thereafter, the secondary battery was charged and discharged in similar charging and discharging conditions except that the current at the time of discharging was changed to 1.0 C, to thereby measure again the discharge capacity (a post-loaded-discharging discharge capacity). It should be understood that 1.0 C is a value of a current that causes the battery capacity to be completely discharged in 1 hour.

Lastly, the following was calculated: load retention rate (%)=(post-loaded-discharging discharge capacity/pre-loaded-discharging discharge capacity)×100.

In a case of examining the cyclability characteristic, first, the secondary battery was charged and discharged in an ambient temperature environment at a temperature of 23° C., to thereby measure a discharge capacity (a pre-cycle discharge capacity). Charging and discharging conditions were similar to the conditions of the case of examining the load characteristic (the charging and discharging conditions at the initial cycle).

Thereafter, the secondary battery was repeatedly charged and discharged until the total number of cycles reached 500, to thereby measure again the discharge capacity (a post-cycle discharge capacity). Charging and discharging conditions were similar to the charging and discharging conditions at the initial cycle.

Lastly, the following was calculated: cycle retention rate (%)=(post-cycle discharge capacity/pre-cycle discharge capacity)×100.

only the chain carboxylic acid ester (Experiment example 1-6), the swelling rate decreased slightly and the load retention rate increased slightly, but the cycle retention rate was equal to that of the comparison reference; and in a case where the electrolytic solution included only the cyclic ether (Experiment example 1-7), the swelling rate decreased greatly and the load retention rate increased slightly, but the cycle retention rate decreased.

On the basis of those tendencies, it is estimated that if the electrolytic solution includes both the chain carboxylic acid ester and the cyclic ether, the cycle retention rate is less than or equal to that of the comparison reference, while the swelling rate decreases and the load retention rate increases. In a case where the electrolytic solution actually included both the chain carboxylic acid ester and the cyclic ether (Experiment example 1-5), the cycle retention rate was equal to that of the comparison reference, while the swelling rate decreased and the load retention rate decreased, as estimated above. However, the swelling rate did not decrease sufficiently and the load retention rate did not increase sufficiently.

In contrast, in cases where the positive electrode active material particle 1 having therein the spinel metal oxide on the surface of the particle of the layered rock-salt lithium composite oxide was used (Experiment examples 1-1 to 1-4), a specific tendency owing to the compatibility between the configuration of the positive electrode 11 and the configuration of the electrolytic solution was obtained.

Compared with a case where the electrolytic solution included neither the chain carboxylic acid ester nor the cyclic ether (Experiment example 1-4) as a comparison

TABLE 1

| Experiment example | Positive electrode active material particle | | | Electrolytic solution | | | | Swelling rate (%) | Load retention rate (%) | Cycle retention rate (%) |
|---|---|---|---|---|---|---|---|---|---|---|
| | Layered rock-salt lithium composite oxide Kind | Spinel metal oxide Kind | Content (ppm) | Chain carboxylic acid ester Kind | Content (wt %) | Cyclic ether Kind | Content (wt %) | | | |
| 1-1 | LiCoO$_2$ | Co$_3$O$_4$ | 600 | EP | 20 | DOX1 | 0.5 | 4.1 | 82 | 84 |
| 1-2 | | | | EP | 20 | — | — | 20.1 | 70 | 42 |
| 1-3 | | | | — | — | DOX1 | 0.5 | 7.1 | 40 | 42 |
| 1-4 | | | | — | — | — | — | 16.7 | 35 | 38 |
| 1-5 | LiCoO$_2$ | — | — | EP | 20 | DOX1 | 0.5 | 13.6 | 65 | 41 |
| 1-6 | | | | EP | 20 | — | — | 22.5 | 50 | 41 |
| 1-7 | | | | — | — | DOX1 | 0.5 | 13.7 | 43 | 40 |
| 1-8 | | | | — | — | — | — | 25.2 | 40 | 41 |

As described in Table 1, the swelling rate, the load retention rate, and the cycle retention rate each varied greatly depending on the configuration of the secondary battery (the positive electrode 11 and the electrolytic solution).

Specifically, in cases where the positive electrode active material particle 1 having therein the spinel metal oxide on the surface of the particle of the layered rock-salt lithium composite oxide was not used (Experiment examples 1-5 to 1-8), no specific tendency owing to compatibility between the configuration of the positive electrode 11 and the configuration of the electrolytic solution was obtained.

Compared with a case where the electrolytic solution included neither the chain carboxylic acid ester nor the cyclic ether (Experiment example 1-8) as a comparison reference: in a case where the electrolytic solution included only the chain carboxylic acid ester (Experiment example 1-2), the load retention rate increased greatly and the cycle retention rate increased slightly, but the swelling rate increased; and in a case where the electrolytic solution included only the cyclic ether (Experiment example 1-3), the swelling rate decreased greatly, and the load retention rate and the cycle retention rate each increased slightly.

On the basis of those tendencies, it is estimated that if the electrolytic solution includes both the chain carboxylic acid ester and the cyclic ether, the load retention rate increases greatly, but the swelling rate decreases slightly and the cycle retention rate increases slightly. In a case where the electrolytic solution actually included both the chain carboxylic acid ester and the cyclic ether (Experiment example 1-1), the swelling rate decreased greatly, and the load retention rate and the cycle retention rate each increased greatly, contrary to the above-described estimation. In this case, the swelling rate decreased markedly and the load retention rate and the cycle retention rate each increased markedly.

Thus, in the case of using the positive electrode active material particle 1 having therein the spinel metal oxide on the surface of the particle of the layered rock-salt lithium composite oxide, the load retention rate and the cycle retention rate each increased sufficiently while the swelling rate was suppressed sufficiently if the electrolytic solution included both the chain carboxylic acid ester and the cyclic ether.

Experiment Examples 2-1 to 2-6

As described in Table 2, secondary batteries were fabricated and the battery characteristics were evaluated by similar procedures except that the content of the spinel metal oxide in the positive electrode active material particle 1 was varied. In this case, upon mixing the layered rock-salt lithium composite oxide powder and the spinel metal oxide powder, a mixture ratio of the spinel metal oxide powder was varied to thereby adjust the content of the spinel metal oxide.

TABLE 2

| Experiment example | Positive electrode active material particle | | | Electrolytic solution | | | | Swelling rate (%) | Load retention rate (%) | Cycle retention rate (%) |
|---|---|---|---|---|---|---|---|---|---|---|
| | Layered rock-salt lithium composite oxide Kind | Spinel metal oxide Kind | Content (ppm) | Chain carboxylic acid ester Kind | Content (wt %) | Cyclic ether Kind | Content (wt %) | | | |
| 2-1 | LiCoO$_2$ | Co$_3$O$_4$ | 70 | EP | 20 | DOX1 | 0.5 | 4.9 | 60 | 57 |
| 2-2 | | | 80 | | | | | 4.1 | 82 | 84 |
| 2-3 | | | 200 | | | | | 4.2 | 83 | 84 |
| 1-1 | | | 600 | | | | | 4.1 | 82 | 84 |
| 2-4 | | | 900 | | | | | 4.0 | 81 | 87 |
| 2-5 | | | 1200 | | | | | 5.0 | 81 | 87 |
| 2-6 | | | 1300 | | | | | 15.6 | 58 | 56 |

As described in Table 2, even if the content of the spinel metal oxide was varied, a high load retention rate and a high cycle retention rate were obtained while the swelling rate was suppressed. In this case, particularly if the content of the spinel metal oxide was from 80 ppm to 1200 ppm both inclusive, the load retention rate and the cycle retention rate each further increased while the swelling rate was suppressed sufficiently.

Experiment Examples 3-1 to 3-10

As described in Table 3, secondary batteries were fabricated and the battery characteristics were evaluated by similar procedures except that the kind of the chain carboxylic acid ester was varied. In this case, newly used as the chain carboxylic acid ester were methyl acetate (MA), butyl acetate (BA), methyl propionate (MP), propyl propionate (PP), methyl butyrate (MB), butyl butyrate (BB), ethyl formate (EF), propyl formate (PF), methyl valerate (MV), and propyl valerate (PV).

TABLE 3

| Experiment example | Positive electrode active material particle | | | Electrolytic solution | | | | Swelling rate (%) | Load retention rate (%) | Cycle retention rate (%) |
|---|---|---|---|---|---|---|---|---|---|---|
| | Layered rock-salt lithium composite oxide Kind | Spinel metal oxide Kind | Content (ppm) | Chain carboxylic acid ester Kind | Content (wt %) | Cyclic ether Kind | Content (wt %) | | | |
| 3-1 | LiCoO$_2$ | Co$_3$O$_4$ | 600 | MA | 20 | DOX1 | 0.5 | 7.5 | 85 | 75 |
| 3-2 | | | | BA | | | | 7.0 | 84 | 77 |
| 3-3 | | | | MP | | | | 6.8 | 83 | 78 |
| 1-1 | | | | EP | | | | 4.1 | 82 | 84 |
| 3-4 | | | | PP | | | | 4.1 | 82 | 83 |

TABLE 3-continued

| | Positive electrode active material | | | Electrolytic solution | | | | | | |
| | particle | | | Chain | | | | | | |
| | Layered rock-salt lithium | Spinel metal oxide | | carboxylic acid ester | | Cyclic ether | | Swelling | Load retention | Cycle retention |
| Experiment example | composite oxide Kind | Kind | Content (ppm) | Kind | Content (wt %) | Kind | Content (wt %) | rate (%) | rate (%) | rate (%) |
|---|---|---|---|---|---|---|---|---|---|---|
| 3-5 | | | | MB | | | | 4.2 | 80 | 78 |
| 3-6 | | | | BB | | | | 4.3 | 78 | 76 |
| 3-7 | | | | EF | | | | 24.7 | 82 | 51 |
| 3-8 | | | | PF | | | | 17.0 | 75 | 50 |
| 3-9 | | | | MV | | | | 5.5 | 75 | 53 |
| 3-10 | | | | PV | | | | 5.6 | 51 | 52 |

As described in Table 3, even if the kind of the chain carboxylic acid ester was varied, a high load retention rate and a high cycle retention rate were obtained while the swelling rate was suppressed. In this case, particularly if the chain carboxylic acid ester satisfied the condition represented by Formula (3), the load retention rate and the cycle retention rate each further increased while the swelling rate was suppressed sufficiently.

Experiment Examples 4-1 to 4-5

As described in Table 4, secondary batteries were fabricated and the battery characteristics were evaluated by similar procedures except that the content of the chain carboxylic acid ester was varied. In this case, a mixture ratio of the chain carboxylic acid ester was varied in the process of preparing the electrolytic solution to thereby adjust the content of the chain carboxylic acid ester. It should be understood that the respective contents of ethylene carbonate and propylene carbonate were varied to be equal to each other, depending on the content of the chain carboxylic acid ester.

As described in Table 4, even if the content of the chain carboxylic acid ester was varied, a high load retention rate and a high cycle retention rate were obtained while the swelling rate was suppressed. In this case, particularly if the content of the chain carboxylic acid ester was from 10 wt % to 40 wt % both inclusive, the load retention rate and the cycle retention rate each further increased while the swelling rate was suppressed sufficiently.

Experiment Examples 5-1 to 5-5

As described in Table 5, secondary batteries were fabricated and the battery characteristics were evaluated by similar procedures except that the kind of the cyclic ether was varied. In this case, newly used as the cyclic ether were: 2-methyl-1,3-dioxane (MDOX1) and 2,2-diethyl-1,3-dioxane (DEDOX1) which are compounds each represented by Formula (4-1); 1,4-dioxane (DOX2) which is a compound represented by Formula (4-2); and tetrahydrofuran (THF) and 2-methyl-tetrahydrofuran (MTHF) which are compounds each represented by Formula (4-3).

TABLE 4

| | Positive electrode active material | | | Electrolytic solution | | | | | | |
| | particle | | | Chain | | | | | | |
| | Layered rock-salt lithium | Spinel metal oxide | | carboxylic acid ester | | Cyclic ether | | Swelling | Load retention | Cycle retention |
| Experiment example | composite oxide Kind | Kind | Content (ppm) | Kind | Content (wt %) | Kind | Content (wt %) | rate (%) | rate (%) | rate (%) |
|---|---|---|---|---|---|---|---|---|---|---|
| 4-1 | $LiCoO_2$ | $Co_3O_4$ | 600 | EP | 5 | DOX1 | 0.5 | 3.8 | 56 | 70 |
| 4-2 | | | | | 10 | | | 3.9 | 78 | 72 |
| 1-1 | | | | | 20 | | | 4.1 | 82 | 84 |
| 4-3 | | | | | 30 | | | 4.1 | 82 | 83 |
| 4-4 | | | | | 40 | | | 4.3 | 81 | 82 |
| 4-5 | | | | | 50 | | | 12.5 | 78 | 50 |

TABLE 5

| Experiment example | Positive electrode active material particle | | | Electrolytic solution | | | | Swelling rate (%) | Load retention rate (%) | Cycle retention rate (%) |
|---|---|---|---|---|---|---|---|---|---|---|
| | Layered rock-salt lithium composite oxide Kind | Spinel metal oxide Kind | Content (ppm) | Chain carboxylic acid ester Kind | Content (wt %) | Cyclic ether Kind | Content (wt %) | | | |
| 1-1 | LiCoO$_2$ | Co$_3$O$_4$ | 600 | EP | 20 | DOX1 | 0.5 | 4.1 | 82 | 84 |
| 5-1 | | | | | | MDOX1 | | 4.2 | 82 | 84 |
| 5-2 | | | | | | DEDOX1 | | 4.4 | 82 | 84 |
| 5-3 | | | | | | DOX2 | | 4.3 | 82 | 84 |
| 5-4 | | | | | | THF | | 3.6 | 83 | 84 |
| 5-5 | | | | | | MTHF | | 4.0 | 83 | 83 |

As described in Table 5, even if the kind of the cyclic ether was varied, a high load retention rate and a high cycle retention rate were obtained while the swelling rate was suppressed.

Experiment Examples 6-1 to 6-5

As described in Table 6, secondary batteries were fabricated and the battery characteristics were evaluated by similar procedures except that the content of the cyclic ether was varied. In this case, an addition amount of the cyclic ether was varied in the process of preparing the electrolytic solution to thereby adjust the content of the cyclic ether.

TABLE 6

| Experiment example | Positive electrode active material particle | | | Electrolytic solution | | | | Swelling rate (%) | Load retention rate (%) | Cycle retention rate (%) |
|---|---|---|---|---|---|---|---|---|---|---|
| | Layered rock-salt lithium composite oxide Kind | Spinel metal oxide Kind | Content (ppm) | Chain carboxylic acid ester Kind | Content (wt %) | Cyclic ether Kind | Content (wt %) | | | |
| 6-1 | LiCoO$_2$ | Co$_3$O$_4$ | 600 | EP | 20 | DOX1 | 0.05 | 7.0 | 72 | 70 |
| 6-2 | | | | | | | 0.1 | 4.5 | 81 | 82 |
| 1-1 | | | | | | | 0.5 | 4.1 | 82 | 84 |
| 6-3 | | | | | | | 1.0 | 3.9 | 81 | 83 |
| 6-4 | | | | | | | 3.0 | 3.8 | 80 | 80 |
| 6-5 | | | | | | | 5.0 | 3.6 | 71 | 73 |

As described in Table 6, even if the content of the cyclic ether was varied, a high load retention rate and a high cycle retention rate were obtained while the swelling rate was suppressed. In this case, particularly if the content of the cyclic ether was from 0.1 wt % to 3.0 wt % both inclusive, the load retention rate and the cycle retention rate each further increased while the swelling rate was suppressed sufficiently.

Based upon the results described in Tables 1 to 6, in the case where the positive electrode active material particle 1 of the positive electrode 11 had therein the spinel metal oxide on the surface of the particle including the layered rock-salt lithium composite oxide, and where the electrolytic solution included the chain carboxylic acid ester and the cyclic ether, both the securing of entering and exiting of lithium and the suppression of the decomposition reaction of the electrolytic solution were achievable. Thus, the swelling characteristic, the load characteristic, and the cyclability characteristic each improved. Accordingly, superior battery characteristics of the secondary battery were obtained.

Although the technology has been described above with reference to the embodiments and Examples, configurations of the technology are not limited to those described with reference to the embodiments and Examples above and are modifiable in a variety of ways.

Specifically, although the description has been given of the case where the structure of the secondary battery is of the laminated-film type, the structure is not particularly limited. Accordingly, the second battery may have other structures including, without limitation, those of a cylindrical type, a prismatic type, a coin type, and a button type.

Moreover, although the description has been given of a case of the battery device having a wound structure, the structure of the battery device is not particularly limited. Accordingly, the battery device may have a structure such as that of a stacked type in which electrodes (a positive electrode and a negative electrode) are stacked on each other or a zigzag folded type in which the electrodes (the positive electrode and the negative electrode) are folded in a zigzag manner.

Further, although the description has been given of a case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

It should be understood that the effects described herein are mere examples, and effects of the technology are therefore not limited to those described herein. Accordingly, the technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
   a positive electrode including a positive electrode active material particle,
   a negative electrode, and
   an electrolytic solution including a chain carboxylic acid ester and a cyclic ether,
   wherein the positive electrode active material particle includes a layered rock-salt lithium composite oxide represented by Formula (1) and a spinel metal oxide represented by Formula (2), and wherein the spinel metal oxide is provided on at least a surface of the layered rock-salt lithium composite oxide;

$$Li_xCo_aNi_bM_{(1-a-b)}O_2 \quad (1)$$

wherein
M represents at least one of magnesium (Mg), aluminum (Al), titanium (Ti), manganese (Mn), yttrium (Y), zirconium (Zr), molybdenum (Mo), or tungsten (W), and x, a, and b satisfy $0.9 \leq x \leq 1.2$, $0 \leq a \leq 1$, and $0 \leq b \leq 1$, respectively, $$X_3O_4 \quad (2)$$

wherein X includes at least one of cobalt (Co), aluminum, magnesium, or zinc (Zn),
a content of the spinel metal oxide in the positive electrode active material particle is from 80 parts per million to 900 parts per million.

2. The secondary battery according to claim 1, wherein the chain carboxylic acid ester includes at least one of compounds each represented by Formula (3), $$R1—C(=O)—O—R2 \quad (3)$$

wherein
each of R1 and R2 represents an alkyl group,
R1 has carbon number from 2 to 4 both inclusive, and
R2 has carbon number from 1 to 4 both inclusive.

3. The secondary battery according to claim 1, wherein the electrolytic solution includes a solvent,
the solvent includes the chain carboxylic acid ester, and a content of the chain carboxylic acid ester in the solvent is from 10 weight percent to 40 weight percent.

4. The secondary battery according to claim 2, wherein the electrolytic solution includes a solvent,
the solvent includes the chain carboxylic acid ester, and a content of the chain carboxylic acid ester in the solvent is from 10 weight percent to 40 weight percent.

5. The secondary battery according to claim 1, wherein the cyclic ether includes at least one of compounds each represented by one of Formula (4-1), Formula (4-2), and Formula (4-3),

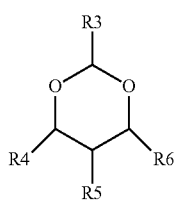

(4-1)

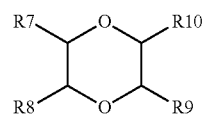

(4-2)

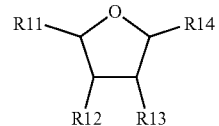

(4-3)

wherein each of R3 to R14 represents one of a hydrogen group and an alkyl group.

6. The secondary battery according to claim 2, wherein the cyclic ether includes at least one of compounds each represented by one of Formula (4-1), Formula (4-2), and Formula (4-3),

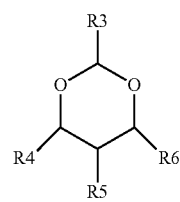

(4-1)

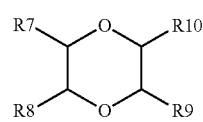

(4-2)

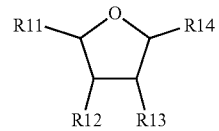

(4-3)

wherein each of R3 to R14 represents one of a hydrogen group and an alkyl group.

7. The secondary battery according to claim 3, wherein the cyclic ether includes at least one of compounds each represented by one of Formula (4-1), Formula (4-2), and Formula (4-3),

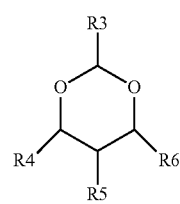

(4-1)

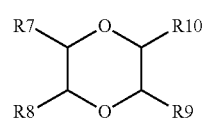

(4-2)

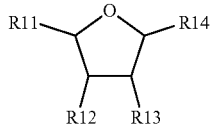

(4-3)

wherein each of R3 to R14 represents one of a hydrogen group and an alkyl group.

8. The secondary battery according to claim 1, wherein a content of the cyclic ether in the electrolytic solution is from 0.1 weight percent to 3.0 weight percent.

9. The secondary battery according to claim 2, wherein a content of the cyclic ether in the electrolytic solution is from 0.1 weight percent to 3.0 weight percent.

10. The secondary battery according to claim 3, wherein a content of the cyclic ether in the electrolytic solution is from 0.1 weight percent to 3.0 weight percent.

11. The secondary battery according to claim 5, wherein a content of the cyclic ether in the electrolytic solution is from 0.1 weight percent to 3.0 weight percent.

12. The secondary battery according to claim 1, wherein the secondary battery includes a lithium-ion secondary battery.

13. The secondary battery according to claim 2, wherein the secondary battery includes a lithium-ion secondary battery.

14. The secondary battery according to claim 1, wherein the layered rock-salt lithium composite oxide includes $LiCoO_2$ and the spinel metal oxide includes $Co_3O_4$.

15. The secondary battery according to claim 14, wherein the cyclic ether includes 1,3-dioxane and the chain carboxylic acid ester includes ethyl propionate.

* * * * *